(12) United States Patent
Battat et al.

(10) Patent No.: US 7,052,426 B2
(45) Date of Patent: May 30, 2006

(54) SEAMED, CONFORMABLE BELT AND METHOD OF MAKING

(75) Inventors: David Battat, Alexandria, VA (US); Edward L. Schlueter, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/055,349

(22) Filed: Jan. 25, 2002

(65) Prior Publication Data

US 2003/0144103 A1 Jul. 31, 2003

(51) Int. Cl.
*F16G 3/00* (2006.01)
*F16G 7/04* (2006.01)

(52) U.S. Cl. ..................................... 474/253

(58) Field of Classification Search ................ 474/253, 474/254, 249, 250, 252; 156/737, 139, 258, 156/159, 304.3, 304.5; 451/531; 428/60, 428/57, 58, 412, 221, 111; 399/302
See application file for complete search history.

(56) References Cited

U.S. PATENT DOCUMENTS

| | | | |
|---|---|---|---|
| 766,930 A * | 8/1904 | Clemons ..................... | 474/254 |
| 1,728,673 A * | 9/1929 | Driver ......................... | 451/531 |
| 2,391,731 A * | 12/1945 | Miller et al. ................ | 451/531 |
| 2,792,318 A * | 5/1957 | Welch ......................... | 428/114 |
| 4,063,463 A * | 12/1977 | Nordengren ................ | 474/254 |
| 4,279,676 A * | 7/1981 | Morrison et al. ........... | 474/254 |
| 4,763,158 A | 8/1988 | Schlueter, Jr. | |
| 4,777,087 A | 10/1988 | Heeks et al. | |
| 4,925,895 A | 5/1990 | Heeks et al. | |
| 5,142,016 A | 8/1992 | Sharf et al. | |
| 5,157,098 A | 10/1992 | Lindblad et al. | |
| 5,194,558 A | 3/1993 | Carlston et al. | |
| 5,259,989 A | 11/1993 | Schlueter, Jr. et al. | |
| 5,259,990 A | 11/1993 | Schlueter, Jr. et al. | |
| 5,286,566 A | 2/1994 | Schlueter, Jr. et al. | |
| 5,286,570 A | 2/1994 | Schlueter, Jr. et al. | |
| 5,298,956 A | 3/1994 | Mammino et al. | |
| 5,409,557 A | 4/1995 | Mammino et al. | |
| 5,424,813 A | 6/1995 | Schlueter, Jr. et al. | |
| 5,454,980 A | 10/1995 | Schlueter et al. | |
| 5,468,834 A | 11/1995 | Finsterwalder et al. | |
| 5,487,707 A | 1/1996 | Sharf et al. | |
| 5,489,850 A | 2/1996 | Werner, Jr. et al. | |
| 5,514,436 A | 5/1996 | Schlueter, Jr. et al. | |
| 5,549,193 A | 8/1996 | Schlueter, Jr. et al. | |
| 5,656,720 A | 8/1997 | Schlueter, Jr. et al. | |
| 5,670,230 A | 9/1997 | Schlueter, Jr. et al. | |
| 5,697,491 A * | 12/1997 | Alex .......................... | 198/846 |
| 5,721,032 A | 2/1998 | Parker et al. | |
| 5,732,320 A | 3/1998 | Domagall et al. | |
| 5,784,679 A | 7/1998 | Schlueter, Jr. et al. | |

(Continued)

FOREIGN PATENT DOCUMENTS

DE 3340432 A1 * 5/1985

*Primary Examiner*—Marcus Charles
(74) *Attorney, Agent, or Firm*—Nixon Peabody LLP

(57) ABSTRACT

A seamed, conformable belt including a substrate having first and second opposing substantially planar surfaces, a first end, and a second end, wherein the first end and the second end of the substrate form a first seam, and an elastomeric layer having a first end and a second end, wherein the elastomeric layer is adjacent and in contact with the first surface of the substrate and wherein the first end and the second end of the elastomeric layer form a second detachable, substantially planar seam.

20 Claims, 9 Drawing Sheets

U.S. PATENT DOCUMENTS

| | | |
|---|---|---|
| 5,814,566 A | 9/1998 | Schlueter, Jr. et al. |
| 5,876,636 A | 3/1999 | Schlueter, Jr. et al. |
| 5,897,248 A | 4/1999 | Schlueter, Jr. et al. |
| 5,918,099 A | 6/1999 | Schlueter, Jr. et al. |
| 5,922,440 A | 7/1999 | Schlueter, Jr. et al. |
| 5,942,301 A | 8/1999 | Schlueter, Jr. et al. |
| 5,951,441 A * | 9/1999 | Dalebout et al. ........... 474/253 |
| 5,974,124 A | 10/1999 | Schlueter, Jr. et al. |
| 5,985,419 A | 11/1999 | Schlueter, Jr. et al. |
| 5,991,590 A | 11/1999 | Chang et al. |
| 5,995,796 A | 11/1999 | Schlueter, Jr. et al. |
| 5,997,974 A | 12/1999 | Schlueter, Jr. et al. |
| 5,998,010 A | 12/1999 | Schlueter, Jr. et al. |
| 5,999,787 A | 12/1999 | Finsterwalder et al. |
| 6,002,902 A | 12/1999 | Thornton et al. |
| 6,042,917 A | 3/2000 | Schlueter, Jr. et al. |
| 6,052,550 A | 4/2000 | Thornton et al. |
| 6,063,463 A | 5/2000 | Schlueter, Jr. et al. |
| 6,118,968 A | 9/2000 | Schlueter, Jr. et al. |
| 6,122,351 A | 9/2000 | Schlueter, Jr. et al. |
| 6,173,152 B1 | 1/2001 | Schlueter, Jr. et al. |
| 6,201,945 B1 | 3/2001 | Schlueter, Jr. et al. |
| 6,245,402 B1 | 6/2001 | Schlueter, Jr. et al. |
| 6,261,659 B1 | 7/2001 | Fletcher et al. |
| 6,263,183 B1 | 7/2001 | Schlueter, Jr. et al. |
| 6,287,498 B1 | 9/2001 | Schlueter, Jr. et al. |
| 6,295,434 B1 | 9/2001 | Chang et al. |
| 6,311,036 B1 | 10/2001 | Jia et al. |
| 6,311,038 B1 | 10/2001 | Schlueter, Jr. et al. |
| 6,311,595 B1 | 11/2001 | Schlueter, Jr. et al. |
| 6,316,070 B1 | 11/2001 | Yu et al. |
| 6,318,223 B1 | 11/2001 | Yu et al. |
| 6,321,903 B1 * | 11/2001 | Shaffer ....................... 474/253 |

* cited by examiner

SEAMED, CONFORMABLE BELT AND METHOD OF MAKING

CROSS REFERENCE TO RELATED APPLICATIONS

The following applications are related to the present application: U.S. patent application Ser. No. 09/493,445, filed Jan. 28, 2000, entitled, "Process and Apparatus for Producing an Endless Seamed Belt;" U.S. patent application Ser. No. 09/470,931, filed Dec. 22, 1999, entitled, "Continuous Process for Manufacturing Imageable Seamed Belts for Printers;" U.S. patent application Ser. No. 09/088,011, filed May 28, 1998, entitled, "Unsaturated Carbonate Adhesives for Component Seams;" U.S. patent application Ser. No. 09/615,444, filed Jul. 13, 2000, entitled, "Polyimide Adhesive For Polyimide Component Interlocking Seams;" U.S. patent application Ser. No. 09/615,426, filed Jul. 13, 2000, entitled, "Process For Seaming Interlocking Seams Of Polyimide Component Using Polyimide Adhesive;" U.S. patent application Ser. No. 09/660,248, filed Sep. 13, 2000, entitled, "Imageable Seamed Belts Having Fluoropolymer Adhesive Between Interlocking Seaming Members;" U.S. patent application Ser. No. 09/660,249, filed Sep. 13, 2000, entitled, "Imageable Seamed Belts Having Fluoropolymer Overcoat;" U.S. patent application Ser. No. 09/833,930, filed Apr. 11, 2001, entitled, "Imageable Seamed Belts Having Hot Melt Processable, Thermosetting Resin and Conductive Carbon Filler Adhesive Between Interlocking Seaming Members;" U.S. patent application Ser. No. 09/833,965, filed Apr. 11, 2001, entitled, "Conductive Carbon Filled Polyvinyl Butyral Adhesive;" U.S. patent application Ser. No. 09/833,488, filed Apr. 11, 2001, entitled, "Dual Curing Process for Producing a Puzzle Cut Seam;" U.S. patent application Ser. No. 10/013,665, filed Dec. 13, 2001, entitled, "Oxidized Transport Transfer Member Coatings;" U.S. patent application Ser. No. 09/833,964, filed Apr. 11, 2001, entitled, "Flashless Hot Melt Bonding of Adhesives for Imageable Seamed Belts;" U.S. patent application Ser. No. 09/833,546, filed Apr. 11, 2001, entitled, "Imageable Seamed Belts having Polyamide Adhesive Between Interlocking Seaming Members;" and U.S. patent application Ser. No. 09/833,507, filed Apr. 11, 2001, entitled, "Polyamide and Conductive Filler Adhesive." Each of these applications is assigned to a common assignee. The disclosures of each of these references are hereby incorporated by reference in their entirety.

FIELD OF THE INVENTION

The present invention relates to seamed, conformable belts and a method of making seamed, conformable belts.

BACKGROUND OF THE INVENTION

Conformable and thick belts have been increasingly used in recent years in printer and photocopying machines, because they provide numerous benefits over thin, hard belts. In particular, the use of conformable and thicker belts allows throughput to be increased, permits greater media latitude, and provides flexibility in terms of the fusing process, release, and image quality. For example, a conformable and thick belt can be used in a printer or photocopy machine with two rigid rollers where the belt forms the nip, may or may not carry the image, and is the only consumable.

Initially, flexible belts were fabricated by taking two ends of a web material and fastening them together by a variety of techniques such as sewing, wiring, stapling, providing adhesive joints, etc. While such joined or seamed belts are suitable for many applications, such as the delivery of rotary motion from a source such as a motor, to implement a device such as a saw blade, they are not as satisfactory in many of the more sophisticated applications of belt technology in common practice today.

In the technology of the current day, many applications of belts require much more sophisticated qualities and utilities. For example, in electrostatographic imaging processes which use a flexible photoreceptor belt or a flexible electroreceptor belt, in combination with either a intermediate transfer member, or image transport devices, or a fusing member, or transfix devices in the flexible belt form, more sophisticated belts are necessary.

It is ideal to provide a seamless conformable belt whereby there is no seam in the belt which mechanically interferes with any operation that the belt performs or any operation that may be performed on the belt. While this is ideal, the manufacture of seamless belts requires rather sophisticated manufacturing processes which are expensive. Typically, seamless belt fabrication is approximately 5–10 times more expensive than seamed belt fabrication. Larger belts are also very difficult to handle in the seamless belt fabrication process. As a result, various attempts have been made to provide seamed belts which can be used in these processes. Previous attempts to manufacture seamed belts have largely relied on belts where the two opposite ends of a rectangularly cut sheet of the belt material have been lapped or overlapped and ultrasonically welded to form the seam.

The belts formed according to the lapping or overlapping and ultrasonic welding technique have excessive seam thickness which provides a bump or other discontinuity in the belt surface. This leads to a significant height differential over the adjacent portions of the belt, of at least 0.003 inches or more depending on the belt thickness, which leads to performance failure in many applications.

In an electrostatographic imaging process utilizing an overlapping ultrasonically welded seamed belt, two severe problems that are encountered during the imaging and cleaning processes are cleaning the imaging belt of residual toner after transfer of the toner image due to the excess in seam height and dynamic fatigue seam cracking as a result of large induced bending stress caused by the increase in seam thickness. In particular, with a bump, crack, or other discontinuity in the seam area of the belt, the cleaning function of a blade is affected which allows toner to pass under the blade and not be effectively cleaned off from the imaging belt surface. A crack in the seam may also become a site that collects and traps toners which are eventually spewed out to the imaging zones of the imaging belt surface causing copy printout defects.

Furthermore, seams having differential heights may, when subjected to repeated striking by cleaning blades, cause the untransferred, residual toner to be trapped in the irregular surface morphology of the seam. As a consequence, an electrostatographic imaging belt which is repeatedly subjected to this striking action, during imaging and cleaning processes, tends to delaminate at the seam. Since the severe mechanical interaction between the cleaning blade and the seam also causes blade wear problems, the result often observed is that both the cleaning life of the blade and the overall life of the imaging belt under a service environment can be greatly diminished as well as degrading the copy print-out quality.

In addition, the mechanical striking of the cleaning blade over the excessive seam height has also been found to give rise to vibrational disturbance in the imaging development zone which affects the toner image formation on the belt and degrades resolution and transfer of the toner image to a receiving copy sheet. Moreover, the discontinuity or seam bump in such a belt may result in inaccurate image registration during development, inaccurate belt tracking, and overall deterioration of motion quality, as a result of the translating vibrations.

It has been shown that an endless seamed belt, having very small seam height differential, can be formed with patterned interlocked ends, the pattern of the ends being formed by using a laser or a die to cut the pattern and the patterned cut ends being brought together to interlock to form a seam. However, such interlocking seams require careful control of the properties of the adhesive used to bond together the seam ends and careful control of the thickness of the bonded seam.

SUMMARY OF THE INVENTION

The present invention relates to a seamed, conformable belt. The belt includes a substrate having first and second opposing substantially planar surfaces, a first end, and a second end, wherein the first end and the second end of the substrate form a first seam, and an elastomeric layer having a first end and a second end, wherein the elastomeric layer is adjacent and in contact with the first surface of the substrate and wherein the first end and the second end of the elastomeric layer form a second, detachable substantially planar seam.

The present invention also relates to a seamed, conformable belt including a substrate having first and second opposing substantially planar surfaces, a first end, and a second end, wherein the first end of the substrate is bonded to the second end of the substrate to form a first seam, and an elastomeric layer having a first end and a second end, wherein the elastomeric layer is adjacent and in contact with the first surface of the substrate and wherein the first end of the elastomeric layer is bonded to the second end of the elastomeric layer to form a second substantially planar seam.

Another aspect of the present invention relates to a method for forming a seamed, conformable belt. This method involves providing a substrate having first and second opposing substantially planar surfaces, a first end, and a second end, coating the first surface of the substrate with an elastomeric layer having a first end and a second end, positioning the first end and the second end of the substrate to form a first seam, and positioning the first end and the second end of the elastomeric layer to form a second, detachable substantially planar seam.

A seamed, conformable belt in accordance with the present invention includes an elastomeric layer with a substantially planar seam, which eliminates the "bump" produced by typical seamed belts that can interfere with the electrical and mechanical operations of the belt. In addition, in embodiments of the present invention, the ends of the elastomeric layer (and, optionally, the substrate) of the belt of the present invention are not bonded together (i.e., are detachable). Thick conformable material can be die or laser cut to geometries that mechanically lock the ends together when mating. This also can allow the adjacent ends of the elastomeric layer to mold into each other when subjected to heat and/or pressure, thereby forming a tight, planar seam in the elastomeric layer. In addition, the lack of bonding between the ends of the elastomeric layer enables the elastomeric layer of the belt to be easily replaced, without the need for replacing the substrate. Further, the lack of bonding between the ends of the elastomeric layer eliminates the need for selecting a bonding agent, e.g., an adhesive, of appropriate conformability and modulus of elasticity to join together the ends of the elastomeric layer.

The belts of the present invention are useful to generate a nip width, to deliver heat for fusing/transfix, or to provide the right coefficient of friction. In addition, the belts of the present invention may also be candidates for paper handling belts and for imaging purposes, e.g., as intermediate transfer belts, by providing a top coating or special treatment for the belts.

DETAILED DESCRIPTION OF THE INVENTION

A seamed, conformable belt in accordance with one embodiment of the present invention is shown in FIGS. 1–7. The endless, seamed belt 10 includes a substrate 12 and an elastomeric layer 14, where the ends of the substrate 12 and the elastomeric layer 14 each form a puzzle cut seam which extends linearly across the width of the belt. The seam formed by the ends of the substrate 12 is an interlocking seam which may or may not be bonded and the seam formed by the ends of the elastomeric layer 14 is a detachable (i.e., unattached), interlocking seam, with virtually no height differential between the seams and adjacent sections of the belt. The interlocking seam produced by the ends of the substrate 12, which may be bonded, allows the belt to function as an endless belt. In addition, the interlocking seams of the belt of the present invention eliminate the "bump" produced by typical seamed belts that can interfere with the electrical and mechanical operations of the belt. Moreover, the ends of the elastomeric layer 14 of the belt 10 of the present invention are able to mold into each other when subjected to heat and/or pressure, thereby forming a tight, planar seam in the elastomeric layer. The presence of an detachable, interlocking seam in the elastomeric layer also makes the elastomeric layer easily replaceable and eliminates the need for selecting a bonding agent, e.g., an adhesive, of appropriate conformability and modulus of elasticity to join together the ends of the elastomeric layer.

Figure 1:
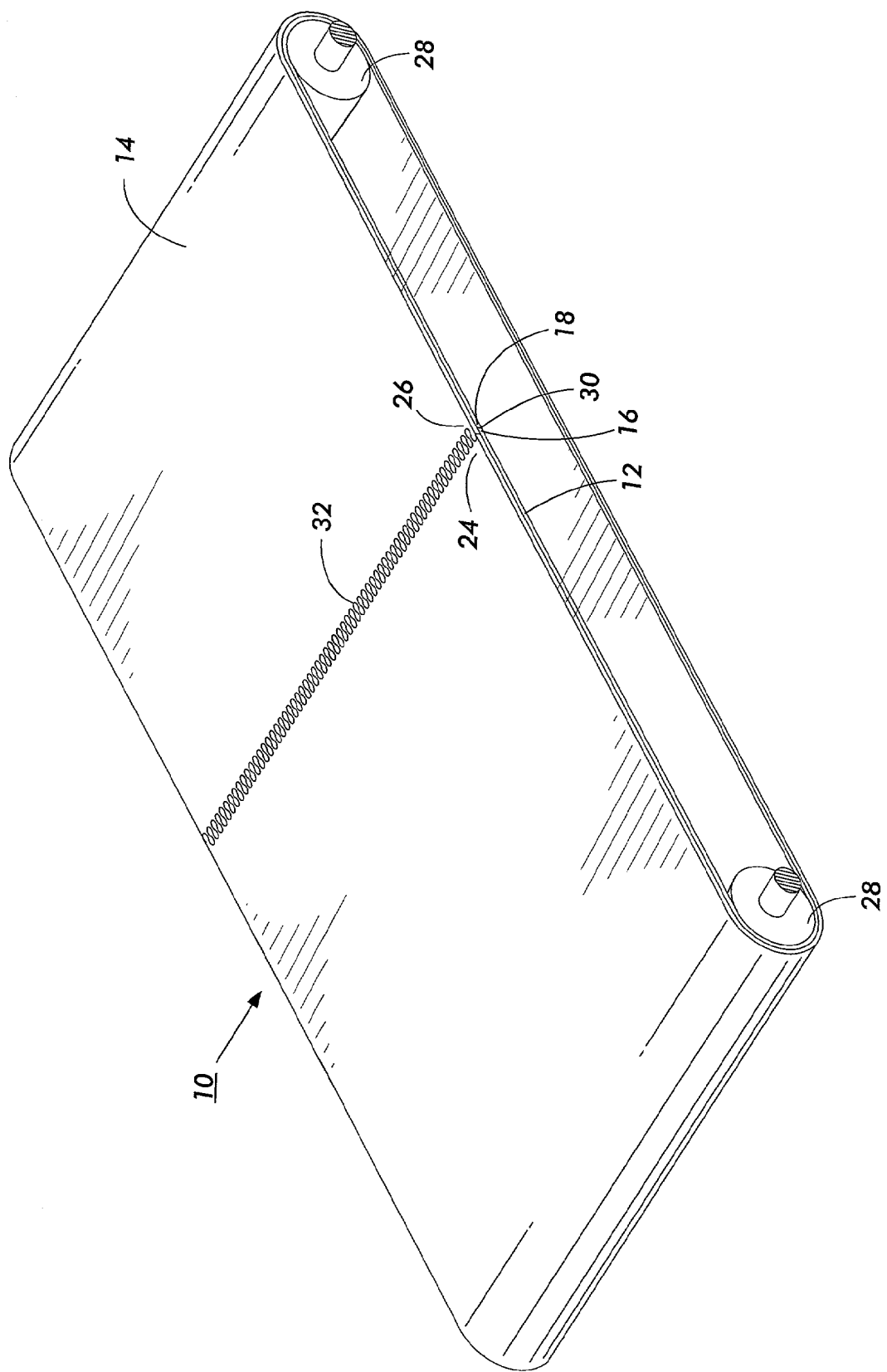
FIG. 1 is a perspective view of a puzzle cut, seamed, conformable belt in accordance with one embodiment of the present invention.
Figure 2:
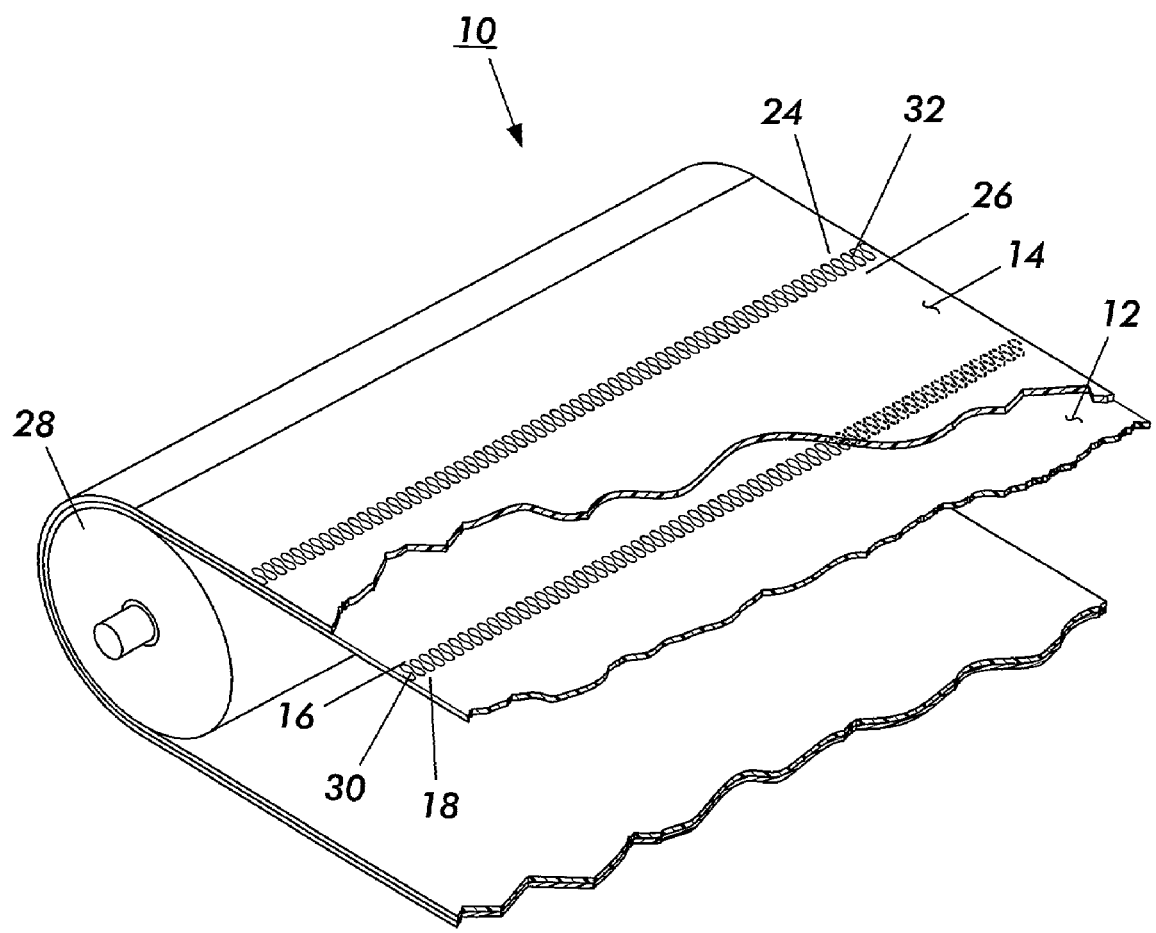
FIG. 2 is a cutaway perspective view of the seamed, conformable belt of FIG. 1.
Figure 3:
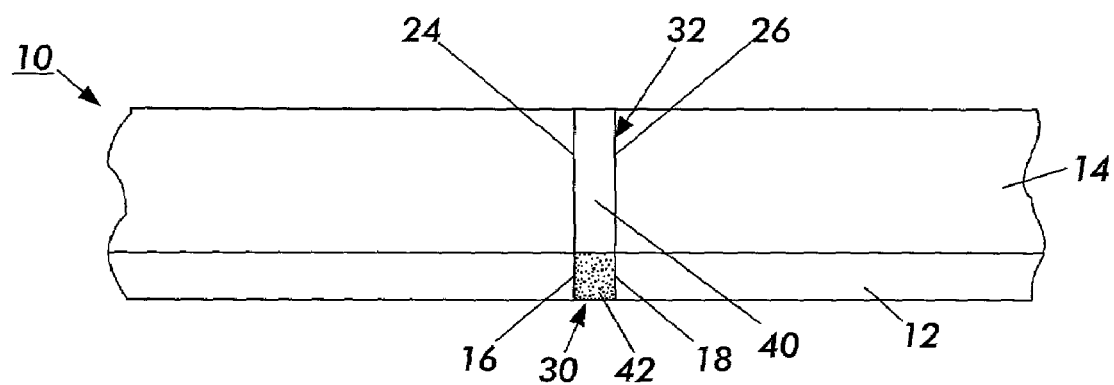
FIG. 3 is a cross-sectional side view of the seamed, conformable belt of FIG. 1.

Referring to FIGS. 1–3, a belt 10 in accordance with the present invention is shown. The belt includes a substrate 12 and an elastomeric layer 14. The substrate 12 has a first end 16 and a second end 18 which are joined together to form a continuous member. In addition, the substrate has a first surface 20 and a second surface 22. The elastomeric layer 14 is adjacent and in contact with the first surface 20 and includes a first end 24 and a second end 26. As shown in FIG. 1, the belt 10 is held in position and turned by the use of rollers 28.

Figure 5:
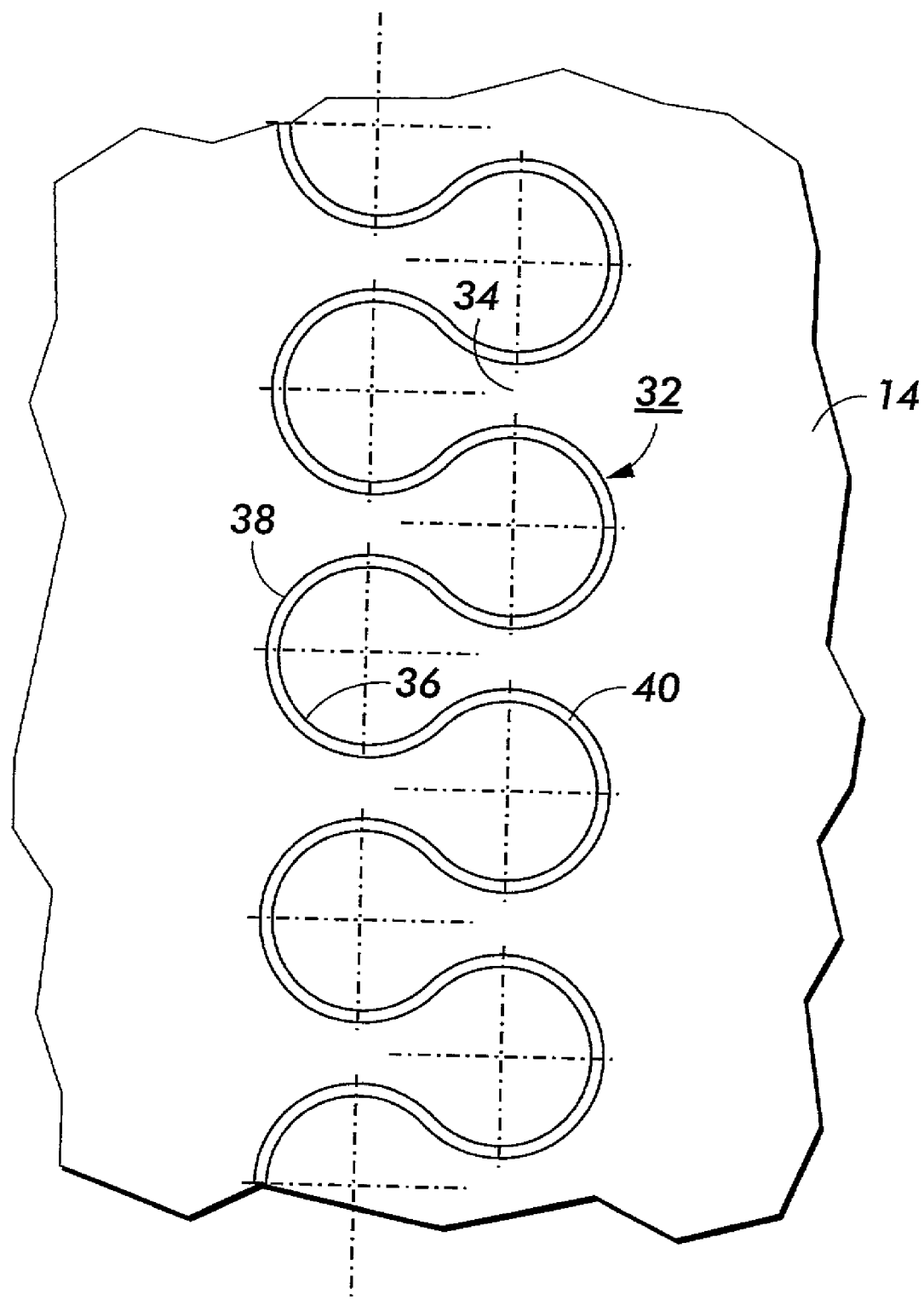
FIG. 5 is a top view of the puzzle cut tabs of FIG. 4 interlocked together.

In this embodiment, the two ends of the substrate 12 and the two ends of the elastomeric layer 14 each form a puzzle cut seam, meaning that the two ends interlock with one another in the manner of an ordinary puzzle to form an interlocking, substantially planar seam. Referring to FIGS. 1 and 3, the two ends of the substrate 12 are bonded together to form a first, bonded interlocking seam 30. The two ends of the elastomeric layer 14 are not bonded to one another (i.e., are unattached or detachable), but are placed in an interlocking fashion to form a second interlocking seam 32, as illustrated in FIGS. 1, 3, and 5. In this embodiment, the first and second interlocking seams 30 and 32 are identical puzzle cut seams, however, different interlocking seams may be used for the first interlocking seam 30 and the second interlocking seam 32. In addition, in this embodiment, the first and second interlocking seams are adjacent each other, however, the seams may offset, as shown in FIG. 2. It should be noted that the mechanical interlocking relationship of the seams 30 and 32 is present in a two dimensional plane when the belt 10 is on a flat surface, whether it be horizontal or vertical. While the seams 30 and 32 are shown as being perpendicular to the two parallel sides of the belt 10 in FIG. 1, the seams 30 and 32 could be angled or slanted with respect to the parallel sides. This enables any noise generated in the system to be distributed more uniformly and the forces placed on each mating element to be reduced. The joining together of the first and second ends (16, 18) of the substrate 12 enables the seamed, conformable belt to essentially function as an endless belt.

Figure 11A:
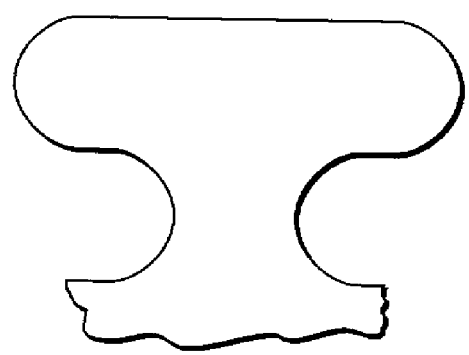
FIG. 11 shows different geometric examples of mating ends of a puzzle cut seam for optimum mechanical advantage.
Figure 11B:
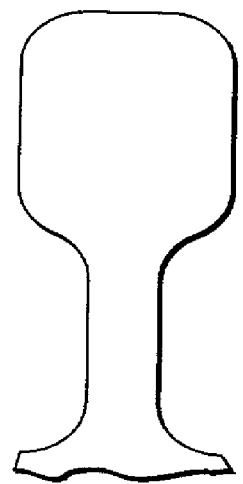

The substrate ends and elastomeric ends are held together, at least in part, by the geometric relationship between the ends of the substrate. The puzzle cut seam can be of many different configurations. Specifically, the mutually mating elements comprise a first projection and a second receptacle geometrically oriented so that the second receptacle receives the first projection. The seam includes a void (or kert) between the mutually mating ends of the substrate and the elastomeric layer. The geometric ends of the seam of the conformable (i.e., elastomeric) material are different than those of rigid seamed belts. In rigid seamed belts, a rounded puzzle can be utilized and is not significantly distorted as the belt is subjected to heat and/or pressure. Therefore, optimum mechanical advantage of linking the two ends is maintained. The conformable material (i.e., elastomeric layer) will deform depending on heat, pressure, conformability, and thickness. The starting geometries, therefore, may be distorted in the static ends to achieve optimum mechanical advantage when the conformable material is in use. Examples of static distorted puzzle cut tabs are shown in FIG. 11. In addition, when cutting conformable materials, e.g., the elastomeric layer 14, the conformable material deforms due to the cutting action. For example, the conformable material may deform so that the cut end exhibits a barrel shape. Therefore, dies and cutting devices can be fabricated to produce a desired end shape so that the final cut pattern maximizes the optimum mechanical linkage of the two mating ends (i.e., increases non-adhesive mechanical linkage between the mating ends).

Figure 4:
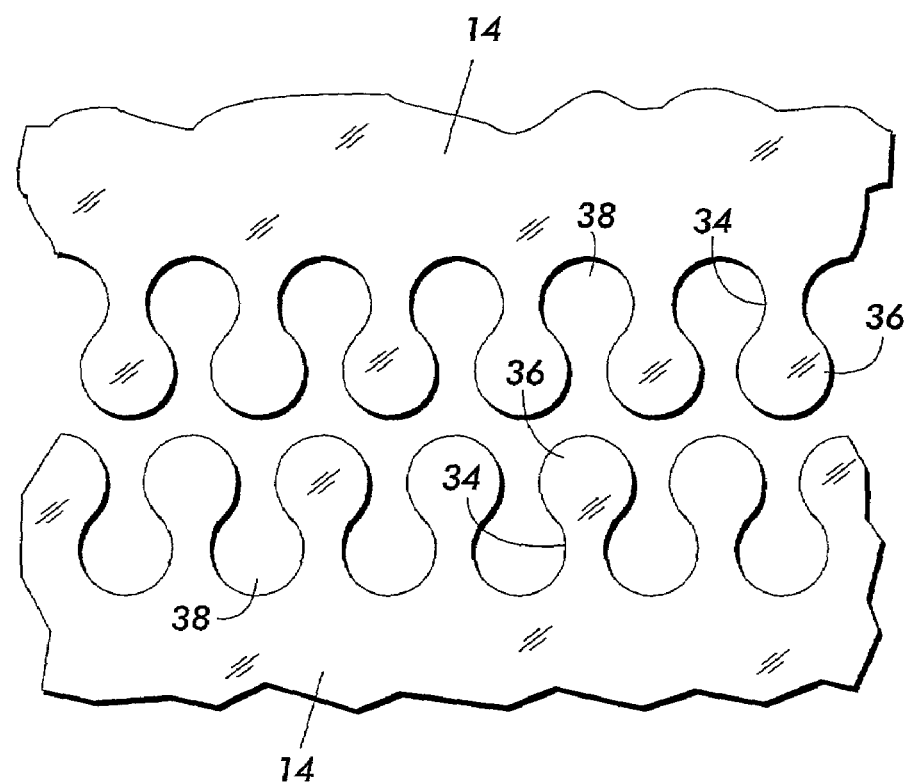
FIG. 4 is a top view of a puzzle cut tab pattern used in the elastomeric layer of the seamed, conformable belt of FIG. 1.

FIG. 4 shows an example of a puzzle cut tab pattern in the elastomeric layer 14. Each tab comprises a neck 34 and a node 36 that fit into female 38 interlocking portions. The tabs can be formed using any conventional shaping techniques, such as die cutting, laser cutting, or a cutting wheel. Following cutting, the mating elements can be deburred and cleaned by air, ultrasonics, or brushing, if necessary. The interlocking tab matings fit to reduce the stress concentration between the interlocking ends and to permit easy travel around curved members, such as the rollers 28 shown in FIG. 1. While FIG. 4 shows one puzzle cut pattern, others are possible. See, for example, U.S. Pat. Nos. 6,002,902 and 5,942,391, which are hereby incorporated by reference in their entirety, for additional puzzle cut patterns. In embodiments, the interlocking elements all have curved mating elements to reduce the stress concentration between the interlocking elements and permit them to separate when traveling around curved members such as the rolls 28 of FIG. 1.

In accordance with the present invention, the seaming parameters for the puzzle cut seam are adjusted to achieve optimum mechanical advantage for the conformable belts of the present invention. For example, larger sized nodes 36 with a lower frequency of nodes per inch, as compared to rigid, thin belts, may be used to achieve optimum mechanical advantage. In particular, nodes of from about 0.6 mm to about 3 mm in diameter, with from about 10 to about 20 nodes per inch along the seam width are particularly useful. Seams are typically from about 1.5 mm to about 4 mm in width to minimize any time out or nonfunctional area of the belt.

FIG. 5 illustrates the puzzle cut tabs of FIG. 4 interlocked together. Physically interlocking the puzzle cut tabs may require pressure when mating the tabs. Interlocking produces a void between the mutually mating ends that is called a kerf 40, as shown in FIGS. 3 and 5.

Figure 6:
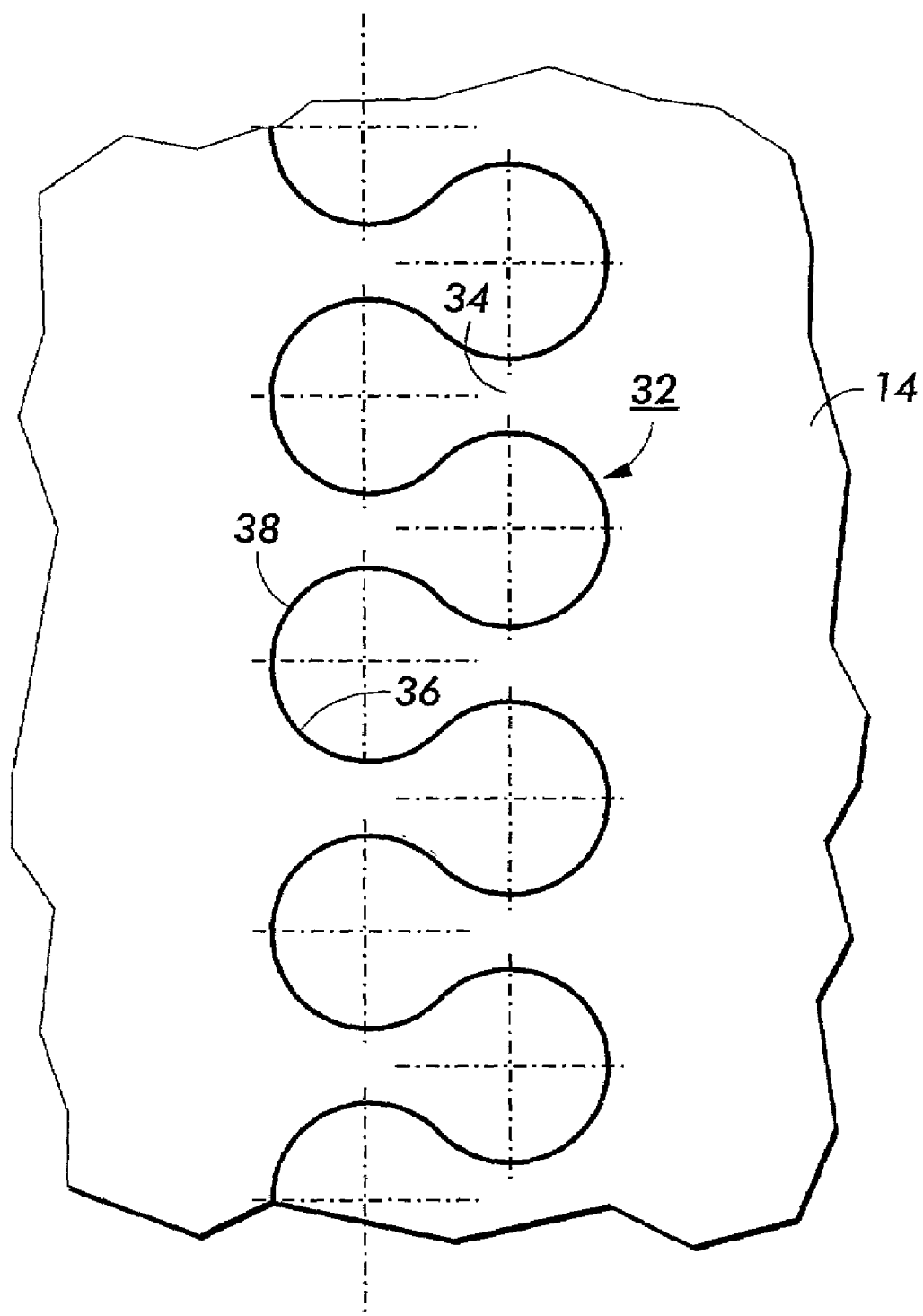
FIG. 6 is a top view of the puzzle cut tabs of FIG. 4 interlocked and molded together.

As shown in FIG. 6, when the elastomeric layer 14 is subjected to head and/or pressure, the ends of the elastomeric layer 14 including, the neck 34 and node 36 that fit into female 38 interlocking portions, are able to mold into each other, thereby forming a tight, planar seam in the elastomeric layer 14.

The joining of the opposite surfaces of the mutually mating first end 16 and second end 18 of the substrate 12 forming the seam 30 may be either a physical joining, a chemical joining, or some combination of physical and chemical joining. The opposite surfaces of the puzzle cut pattern may alternatively be bound with an adhesive which is physically and chemically compatible with the substrate material. Typically, this joining provides a bonding between the opposite surfaces of the mutual mating elements which provides an improved seam quality and smoothness with substantially no thickness differential between the seam and the adjacent portions of the belt (i.e., a substantially planar seam). In this regard, it should be noted that the lower the differential in height, the faster that the belt may travel. However, with increased thickness of the elastomeric layer 14, an increased thickness differential between the seam 30 and the adjacent portions of the substrate 12 may be tolerated. In any case, the opposite surfaces of the puzzle cut pattern being joined together are bound with sufficient physical integrity to enable the seamed conformable belt to essentially function as an endless belt. The two ends of the seamed substrate may be joined by heating such as by welding, including ultrasonic welding, arc welding, and impulse welding.

Alternatively, the first and second ends 16 and 18 of the substrate having the puzzle cut pattern at each end may be joined by a chemical reaction. This happens in the instance where the substrate material is a thermoplastic and upon heating the thermoplastic at least softens, if not melts, and flows to fill the voids in the seam.

Figure 7:
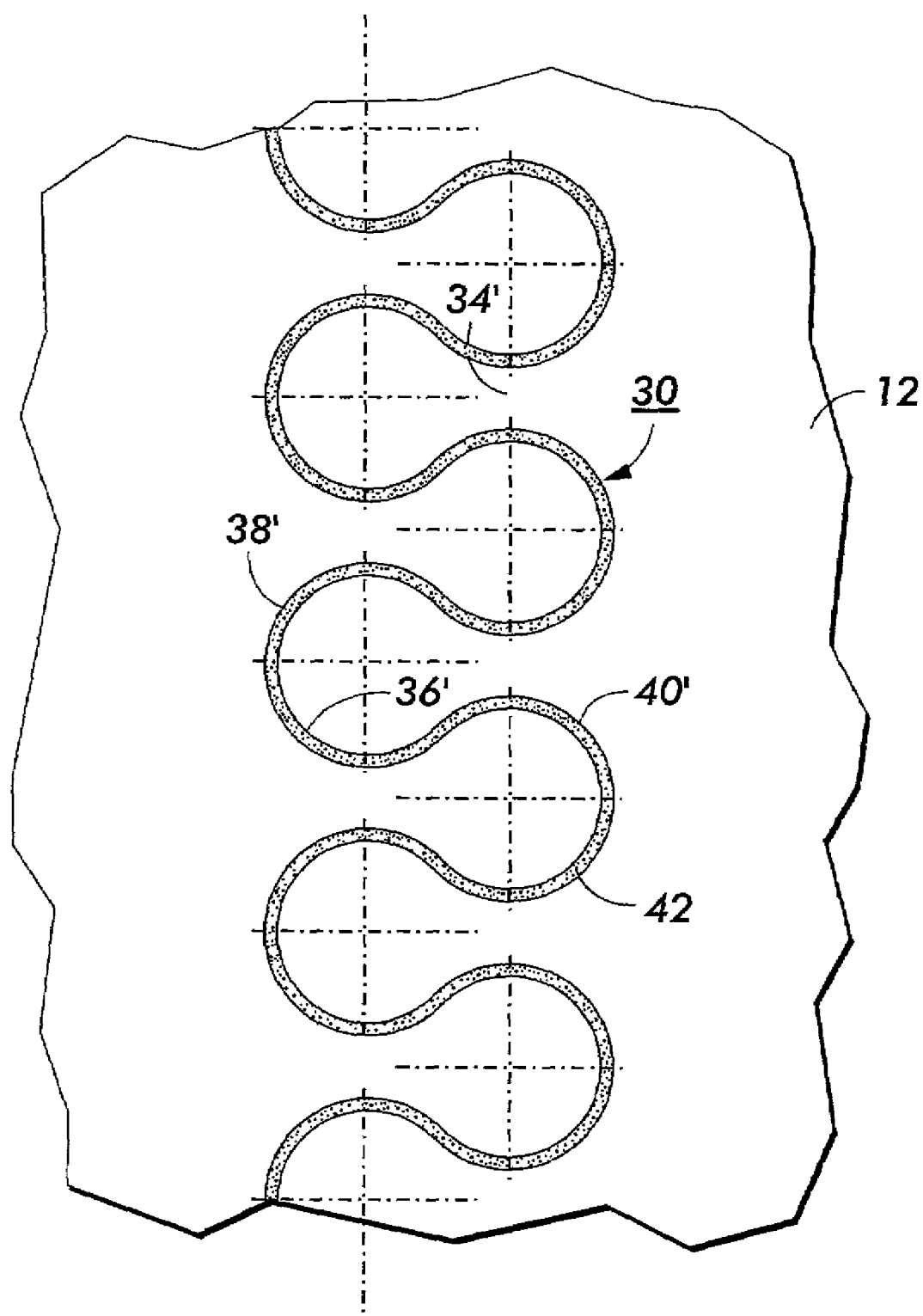
FIG. 7 is a top view of puzzle cut tabs of the substrate of the seamed, conformable belt of FIG. 1 with the kerf filled with an adhesive.

As shown in FIGS. 3 and 7, another alternative is to apply an adhesive 42 to the void between the mutually mating ends of substrate 12, and in particular, to the opposite surfaces of the puzzle cut pattern (34', 36', 38'). With the use of an adhesive a much wider kerf 40' may be used than the narrow kerf 40' that may be used for bonding by heat and pressure only. This also permits the adhesive to wick into the void or kerf areas. In this regard, the viscosity of the adhesive is important since it's performance depends on it's ability to wick into the voids or the kerf 40' between adjacent cut pieces of the pattern. Accordingly, a relatively high viscosity adhesive will not perform as satisfactorily as a low viscosity adhesive. The adhesive is designed to be physically and chemically compatible with the substrate material and suitable for the intended use of the belt (i.e., stable at high temperatures for fuser/transfix applications). In one embodiment, the adhesive matches the modulus of elasticity and density of the substrate. The adhesive may be the same as or different than the substrate material and may be either physically and/or chemically bound to the substrate. Suitable adhesives include hot melt adhesives (e.g., polyamides, urethanes, and polyesters), UV curable adhesives (e.g., epoxies), and adhesives described in U.S. Pat. No. 6,316,070, which is hereby incorporated by reference in its entirety. In addition, heat and/or pressure may be applied after the adhesive is applied. It is desirable that the adhesive material applied is of a thickness to provide a quantity of adhesive to fill the kerf 40' between the ends of the substrate 12. Following bonding, whether it be physical, chemical, or by way of adhesive or any combination of the above, although it may not be necessary, it may be desirable to apply pressure to flatten the seam. In addition, the seam can be finished by buffing, sanding, or micropolishing to smooth the seam.

Yet another alternative is to make the puzzle cut seam of the substrate hold together, such that a bonding agent is not necessary. In particular, the geometry of the puzzle cut seam of the substrate can be produced such that the kerf 40' is eliminated and the mating ends of the puzzle cut seam will hold together without any adhesive or other bonding agent. The criteria for determining such optimum geometry include: (1) the seam can support the applied loading on the belt; (2) the seam will not come apart in operation; and (3) the seam is neither too wide for process purposes, nor too fine to produce (see U.S. Pat. No. 6,311,595, which is hereby incorporated by reference).

The mechanical bonding, strength, and flexibility of the bond should be capable of supporting a belt cycling of at least 100,000 cycles and it is desirable that the belt operates satisfactorily for more than 1,000,000 cycles. The seam height for the seam 30 between the first end 16 and the second end 18 of the substrate and the seam 32 between the first end 24 and the second end 26 of the elastomeric layer in the embodiment shown in FIGS. 1–7 is relatively uniform with the rest of the belt (i.e., substantially planar), so that the seams do not interfere to any great extent with any operation performed thereon. In particular, there is substantially no height differential between the seamed portion and the unseamed portion on each side of the seam. In one embodiment, the height differential between the seams 30 and 32 and the rest of the belt (the non-seamed portions of the belt) is from about 0 to about 50 µm. It is desirable that the height differential is from about 0.0001 to about 25 µm, or from about 0.01 to about 15 µm.

While the foregoing has described the use of puzzle-cut seams, the principles of the present invention can be practiced with other types of substantially planar seams, where the thickness at the seam remains substantially constant and does not undergo a discontinuity. An example of another type of substantially planar seam is a seam in which the ends of the substrate are butted against one another and then fastened mechanically by heat or other means of adhesion, such as by the use of an adhesive. Alternatively, a non-planar seam 30, such as an overlapping seam, may be used in the substrate 12 where the thickness of the elastomeric layer 14 is sufficient to prevent the non-planar seam 30 from interfering with any operation performed on or by the belt.

The seamed, conformable belt 10 in accordance with the present invention is typically from about 0.5 mm to about 5 mm in thickness. In addition, the seamed, conformable belt 10 of the present invention typically has a modulus of elasticity of from about 75 PSI to about 3,000 PSI, corresponding to about 20 to about 90 Shore A hardness.

The endless, seamed substrate 12 may be made of any suitable material, based on the intended use of the belt 10. Typical materials include woven and non-woven fabrics (e.g., Nomex™ (see, e.g., U.S. Pat. No. 6,263,183, which is hereby incorporated by reference in its entirety)) polyesters, polyurethanes, polyimides, polyvinyl chlorides, polyolefins (such as polyethylene and polypropylene), polyamides (such as nylon, polycarbonates, and acrylics), and any other substrate material that would meet the requirements of flexibility, strength, and heat resistance, to maintain integrity under the conditions of use (e.g., high heat and pressure). The thickness of the substrate is typically from about 0.25 mm to about 0.5 mm.

Similarly, the elastomeric layer 14 may be made of any suitable material, based on the intended use of the belt 10. Typical materials include neoprene, silicones, fluoropolymers, silicone-fluoropolymer hybrids, nitrites, silicon-nitriles, and other elastomers that fulfill the requirements to maintain integrity under the conditions of use. The thickness of the elastomeric layer is typically from about 0.25 mm to about 4.75 mm and is determined by the intended use of the belt 10. In particular, thick elastomeric layers of from about 2 mm to about 2.75 mm are desirable for fuser/transfix applications.

As described above, the substrate and elastomeric layer material are selected to have the appropriate physical characteristics for specific utilities. For example, tensile strength, Young's modulus (e.g., $1\times10^3$ to $1\times10^6$), electroconductivity, volume resistivity (e.g., $10^8$ to $10^{11}$ ohm cm), lateral resistivity, thermal conductivity, stability (e.g., mechanical, chemical, and electrical stability in both static and under dynamic conditions), flex strength, and in certain applications, such as transfix, high temperature longevity are determined based on the specific utility of the belt. Other important characteristics of the belt material, depending on its use, include low surface energy for good toner release, gloss, dielectric constant, and strength (see, e.g., U.S. Pat. Nos. 6,311,036 and 6,263,183, which are hereby incorporated by reference in their entirety).

Referring to FIG. 3, the elastomeric layer 14 is coated onto the substrate 12, typically in sheet form using standard sheet film coating techniques. If the elastomeric layer 14 is formed from a liquid elastomer, that liquid elastomer may adequately soak into the substrate 12 and is then cured by, for example, air drying, heating, or cooling. Alternatively, the elastomeric layer 14 may be bonded to the substrate 12 using, for example, an appropriate adhesive, such as a strong, heat-resistant glue.

Figure 8:
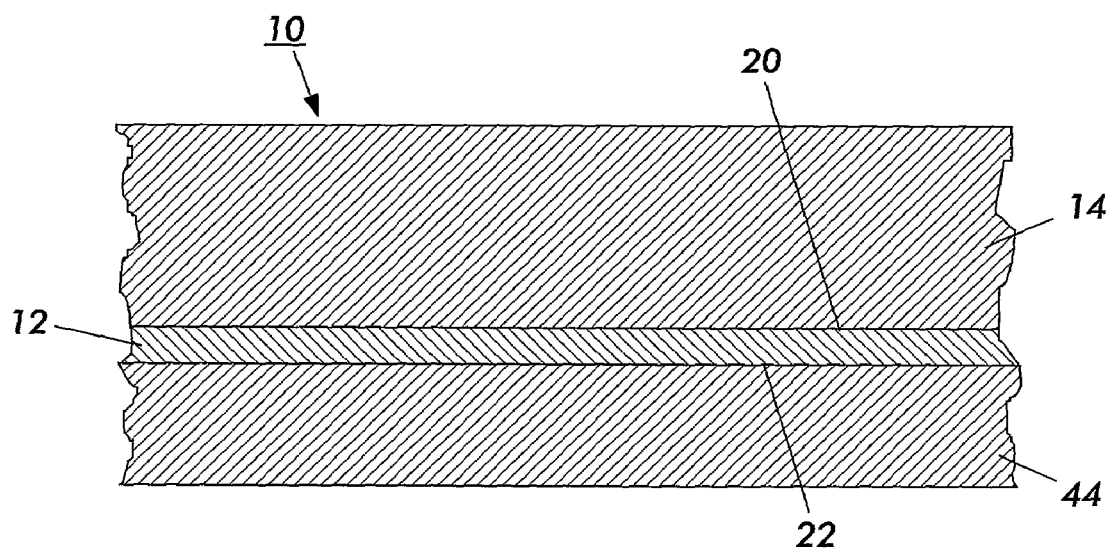
FIG. 8 is a cross-sectional side view of a seamed, conformable belt in accordance with a second embodiment of the present invention.

While FIGS. 1–3 illustrate a two layer belt, the principles of the present invention can be used with belts having more layers. For example, additional elastomeric layers can be coated sequentially onto the first surface 20 of the substrate. Alternatively, in a second embodiment of the present invention, additional elastomeric layers can be coated onto the second surface 22 of the substrate, as shown in FIG. 8. In this embodiment, the belt 10 further includes a lower elastomeric layer 44, which like elastomeric layer 14 will maintain its strength and other properties with repeated cycling under the desired conditions of use (e.g., high temperature).

The seamed, conformable belt 10 in accordance with the present invention may further include a reinforcement members on either or both sides of the belt. Suitable reinforcement members are known in the art and include tape and beads of elastomers.

Figure 9:
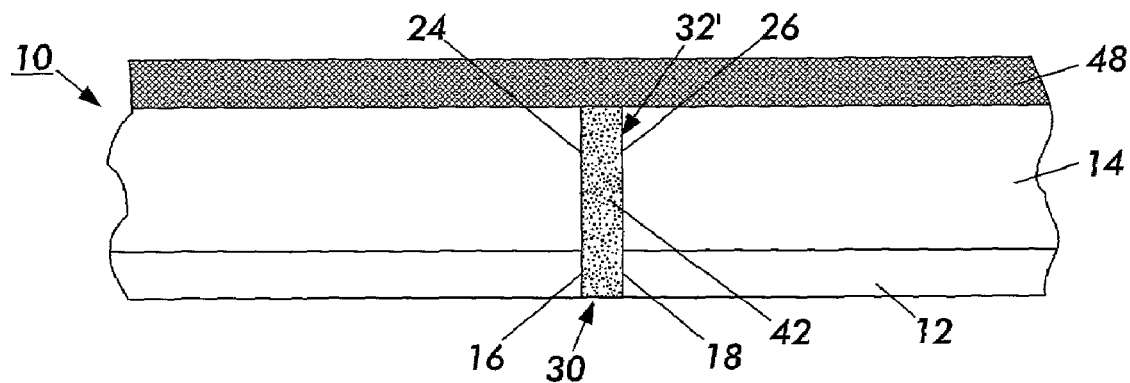
FIG. 9 is a cross-sectional side view of a belt in accordance with a third embodiment of the present invention in which a separate topcoat is applied over an elastomeric layer of the seamed, conformable belt.
Figure 10:
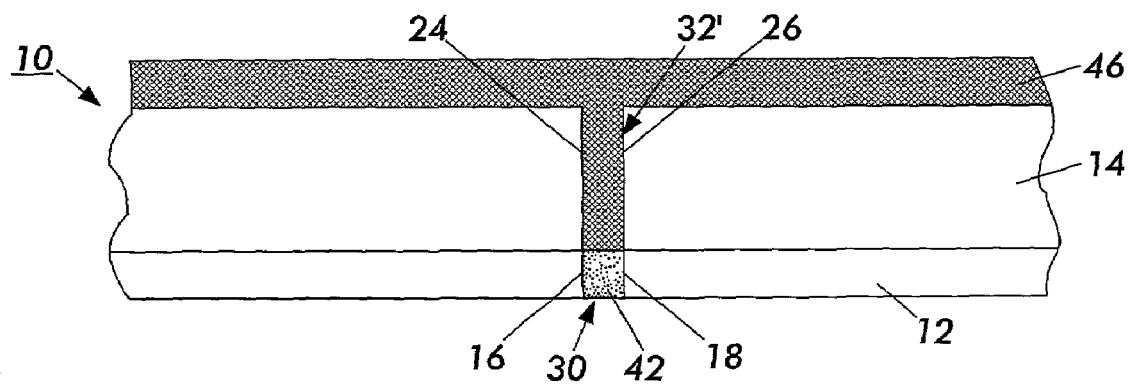
FIG. 10 is a cross-sectional side view of a seamed, conformable belt of FIG. 3 in which an adhesive is applied over an elastomeric layer of the seamed, conformable belt to form a topcoat.

Referring to FIGS. 9 and 10, a seamed, conformable belt in accordance with a third embodiment of the present invention is shown. In this embodiment, the seamed conformable belt 10 is identical to the above-described seamed, conformable belt, except the first end 24 and the second end 26 of the elastomeric layer 14 are bonded together to form a second, bonded interlocking seam 32'.

As shown in FIG. 9, the first end 24 and the second end 26 may be bonded as described above, for example, using an adhesive which is compatible with the elastomeric layer and which exhibits similar properties to the elastomeric layer. In yet another embodiment, as shown in FIG. 9, a separate topcoat 48 for imaging purposes may be provided.

Alternatively, as shown in FIG. 10, the first end 24 and the second end 26 may be bonded through the use of a topcoat material 46 which may comprise an adhesive. The topcoats 46 and 48 may be applied using conventional processes, such as dip coating, flow coating, and spray coating. Suitable topcoats include, but are not limited to, polymer coatings (e.g., polymer coatings comprising polycarbonate transport layers), release layer coatings, and the like. For example, suitable topcoats include low surface free energy materials, such as TEFLON™ type fluoropolymers, including fluorinated ethylene propylene copolymer (FEP), polytetrafluoroethylene (PTFE), polyfluoroalkoxy polytetrafluoroethylene (PFA TEFLON™); fluoroelastomers, such as those sold by DuPont under the tradename VITON™; and silicone materials, such as fluorosilicones and silicone rubbers (see, e.g., U.S. Pat. No. 6,311,036, which is hereby incorporated by reference in its entirety). The topcoat (46, 48) is typically from about 0.01 mm to about 0.2 mm in thickness and may or may not contain conductive fillers, such as metal oxides, graphite, carbon black, or the like).

Moreover, the seamed, conformable belt 10 in accordance with the present invention may be of sufficient dimensions to be attached to a drum or roller, which is typically hard and metallic. In this embodiment, an adhesive may be provided on the second surface 22 of the substrate 12 to adhere the belt to the drum or roller, thereby preventing the belt from creeping over the drum or roller. There are numerous advantages to covering the drum or roller in the manner. For example, there is no need to mold the conformable belt over the rigid roller or drum and there is no need to have different molds to cover different sized rollers or drums. Moreover, the length of the belt can be stretched to obtain the necessary friction to prevent the layer from creeping over the roller or drum and the initial stretch in the belt can be designed to aid in the stripping of the belt from the roller or drum.

The seamed, conformable belts of the present invention can be made by a method which involves providing a substrate having first and second opposing substantially planar surfaces, a first end, and a second end, coating the first surface of the substrate with an elastomeric layer having a first end and a second end, positioning the first end and the second end of the substrate to form a first seam, and positioning the first end and the second end of the elastomeric layer to form a second, detachable substantially planar seam.

Embodiments of the method of the present invention may further include bonding the first end of the substrate to the second end of the substrate and/or bonding the first end of the elastomeric layer to the second end of the elastomeric layer. The method of the present invention allows the production of any belt length required and any belt structure desired.

The seamed, conformable belt 10 in accordance with the present invention may be used to generate a nip width, to deliver heat for fusing/transfix, to provide the right coefficient of friction, or for paper handling belts. In addition, the belts of the present invention may also be candidates for imaging purposes. In this embodiment, a top coating (46, 48) is provided on the elastomeric layer 14 or the elastomeric layer 14 is subjected to special treatment. See, e.g., U.S. Pat. Nos. 6,311,036 and 6,263,183, which are hereby incorporated by reference in their entirety, for detailed descriptions of belt use in the above-described applications.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed process to any order except as may be specified in the claims.

What is claimed is:

1. A seamed, conformable belt comprising:
    a substrate having first and second opposing substantially planar surfaces, a first end, and a second end, wherein the first end and the second end of the substrate form a first seam; and
    an elastomeric layer having a first end and a second end, wherein the elastomeric layer is adjacent to, and in contact with, the first surface of the substrate,
    wherein the first end of the elastomeric layer is engaged with the second end of the elastomeric layer to form a second, detachable, substantially planar, interlocking puzzle cut seam, the first and second ends of the elastomeric layer interlocking with one another such that the first and second ends are mechanically and detachably locked together, and
    wherein the interlocking puzzle cut seam between the first and second ends of the elastomeric layer provides a mechanically removable connection between the first and second ends of the elastomeric layer that is maintained solely by frictional engagement.

2. The seamed, conformable belt according to claim 1 wherein the first seam is an interlocking puzzle cut seam, wherein the first and second ends of the substrate interlock with one another such that the first and second ends are mechanically and detachably locked together.

3. The seamed, conformable belt according to claim 2 wherein the interlocking seams include a kerf.

4. The seamed, conformable belt according to claim 2 wherein the interlocking seams comprise nodes of from about 0.6 mm to about 3 mm in diameter.

5. The seamed, conformable belt according to claim 2 wherein the interlocking seams comprise from about 10 to about 20 nodes per inch along the seams.

6. The seamed, conformable belt according to claim 1 wherein the first seam is bonded.

7. The seamed, conformable belt according to claim 1 wherein the seamed, conformable belt has a modulus of elasticity of from about 75 PSI to about 3000 PSI.

8. The seamed, conformable belt according to claim 1 wherein the seamed, conformable belt has a thickness of from about 0.5 mm to about 5 mm.

9. The seamed, conformable belt according to claim 1 wherein the elastomeric layer has a thickness of from about 0.25 mm to about 4.75 mm.

10. The seamed, conformable belt according to claim 1 wherein the interlocking puzzle cut seam between the first and second ends of the elastomeric layer facilitates removal and replacement of the elastomeric layer without necessitating removal or modification of the substrate.

11. A method for forming a seamed, conformable belt comprising:
providing a substrate having first and second opposing substantially planar surfaces, a first end, and a second end;
coating the first surface of the substrate with an elastomeric layer having a first end and a second end, wherein the elastomeric layer is adjacent to, and in contact with, the first surface of the substrate;
positioning the first end and the second end of the substrate to form a first seam; and
positioning the first end of the elastomeric layer in engagement with the second end of the elastomeric layer to form a second, detachable, substantially planar, interlocking puzzle cut seam, the first and second ends of the elastomeric layer interlocking with one another such that the first and second ends are mechanically and detachably locked together, and
wherein the interlocking puzzle cut seam between the first and second ends of the elastomeric layer provides a mechanically removable connection between the first and second ends of the elastomeric layer that is maintained solely by frictional engagement.

12. The method according to claim 11 wherein the first seam is an interlocking puzzle cut seam, wherein the first and second ends of the substrate interlock with one another such that the first and second ends are mechanically and detachably locked together.

13. The method according to claim 12 wherein the interlocking seams include a kerf.

14. The method according to claim 12 wherein the interlocking seams comprise nodes of from about 0.6 mm to about 3 mm in diameter.

15. The method according to claim 12 wherein the interlocking seams comprise from about 10 to about 20 nodes per inch along the seams.

16. The method according to claim 11 wherein the first seam is bonded.

17. The method according to claim 11 wherein the seamed, conformable belt has a modulus of elasticity of from about 75 PSI to about 3000 PSI.

18. The method according to claim 11 wherein the seamed, conformable belt has a thickness of from about 0.5 mm to about 5 mm.

19. The method according to claim 11 wherein the elastomeric layer has a thickness of from about 0.25 mm to about 4.75 mm.

20. The method according to claim 11 wherein the interlocking puzzle cut seam between the first and second ends of the elastomeric layer facilitates removal and replacement of the elastomeric layer without necessitating removal or modification of the substrate.

* * * * *